US 6,563,966 B1

(12) United States Patent
Tang

(10) Patent No.: US 6,563,966 B1
(45) Date of Patent: May 13, 2003

(54) METHOD, SYSTEMS AND APPARATUS FOR PROVIDING TRUE TIME DELAYED SIGNALS USING OPTICAL INPUTS

(75) Inventor: Suning Tang, Austin, TX (US)

(73) Assignee: Finisar Corporation, Inc.

(*) Notice: Subject to any disclaimer, the term of this patent is extended or adjusted under 35 U.S.C. 154(b) by 0 days.

(21) Appl. No.: 09/519,068

(22) Filed: Mar. 3, 2000

Related U.S. Application Data

(60) Provisional application No. 60/121,900, filed on Mar. 4, 1999.

(51) Int. Cl.[7] .......................... G02F 1/295; G02F 1/335
(52) U.S. Cl. .......................... 385/10; 385/32; 385/37
(58) Field of Search .......................... 385/14, 24, 37, 385/32, 10, 15, 31, 47, 48

(56) References Cited

U.S. PATENT DOCUMENTS

| | | | |
|---|---|---|---|
| 3,836,970 A | 9/1974 | Reitzig ................. 343/100 ST |
| 4,343,890 A | * 8/1982 | Phillips et al. .............. 430/321 |
| 4,359,373 A | * 11/1982 | Hammer ................ 204/192.34 |
| 4,413,263 A | 11/1983 | Amitay et al. .............. 343/786 |
| 4,532,518 A | 7/1985 | Gaglione et al. ........... 343/372 |
| 4,885,589 A | 12/1989 | Edward et al. ............. 342/175 |
| 4,939,527 A | 7/1990 | Lamberty et al. ........... 343/771 |
| 5,116,461 A | * 5/1992 | Lebby et al. ................. 216/2 |
| 5,162,803 A | 11/1992 | Chen .......................... 342/372 |
| 5,206,655 A | 4/1993 | Caille et al. ......... 343/700 MS |
| 5,253,188 A | 10/1993 | Lee et al. .............. 364/371.02 |
| 5,283,587 A | 2/1994 | Hirshfield et al. .......... 342/372 |
| 5,287,117 A | 2/1994 | Posluszny ................. 349/763 |
| 5,374,935 A | 12/1994 | Forrest ...................... 342/368 |
| 5,461,687 A | * 10/1995 | Brock ......................... 385/37 |
| 5,463,656 A | 10/1995 | Polivka et al. .............. 375/290 |
| 5,488,380 A | 1/1996 | Harvey et al. .............. 342/368 |
| 5,493,306 A | 2/1996 | Rudish et al. .............. 342/372 |
| 5,539,413 A | 7/1996 | Farrell et al. ............... 342/372 |
| 5,543,805 A | 8/1996 | Thaniyavarn .............. 342/368 |
| 5,561,434 A | 10/1996 | Yamazaki ............ 343/700 MS |
| 5,623,270 A | 4/1997 | Kempkes et al. ........... 342/372 |
| 5,694,134 A | 12/1997 | Barnes ....................... 343/700 |
| 5,745,079 A | 4/1998 | Wang et al. ......... 343/700 MS |
| 5,852,687 A | * 12/1998 | Wickham ..................... 385/14 |
| 6,097,861 A | * 8/2000 | Kim et al. .................... 385/27 |
| 6,114,994 A | * 9/2000 | Soref et al. ................. 342/372 |
| 6,137,442 A | * 10/2000 | Roman et al. .............. 342/375 |
| 6,208,773 B1 | * 3/2001 | Wickham et al. ............ 385/10 |
| 6,222,962 B1 | * 4/2001 | Nilsson et al. ............... 385/37 |
| 6,295,395 B1 | * 9/2001 | Paek ........................... 385/24 |
| 6,298,184 B1 | * 10/2001 | Putnam et al. ............... 385/37 |

OTHER PUBLICATIONS

Ortega et al., "Microwave Phase Shifter Based on a Fibre Bragg Grating Operating at Constant Wavelength", Optical Fiber Cmmunication Conference, Feb. 21–26, 1999, vol. 4, pp. 162–164.*

(List continued on next page.)

Primary Examiner—Akm E. Ullah
Assistant Examiner—Michelle R. Connelly-Cushwa
(74) Attorney, Agent, or Firm—Gray Cary Ware & Friedenrich LLP

(57) ABSTRACT

A method, systems and apparatus for providing true-time-delayed signals using optical inputs is disclosed. In one aspect a system for providing optical true-time-delayed signals is provided. The system includes at least one optical source having emitting an optical signal having a predetermined wavelength, an optical waveguide optically coupled to the at least one optical source, and a diffraction element optically coupled to the waveguide, the diffraction element positioned along the waveguide at a predetermined distance.

29 Claims, 2 Drawing Sheets

OTHER PUBLICATIONS

Chang et al., "Optically Controlled Serially Fed Phased–Array Transmitter", IEEE Microwave and Guided Wave Letters, vol. 7, No. 3, Mar. 1997, pp. 69–71.*

Cohen et al., "Optically Controlled Serially Fed Phased Array Sensor", IEEE Photonics Technology Letters, vol. 8, No. 12, Dec. 1996, pp. 1683–1685.*

Corral et al., "True Time–Delay Scheme for Feeding Optically Controller Phased–Array Antennas Using Chirped–Fiber Gratings", IEEE Photonics Technology Letters, vol. 9, No. 11, Nov. 1997, pp. 1529–1531.*

Molony et al., "Fiber Bragg–Grating Ture Time–Delay Systems: Discrete–Grating Array 3–b Delay Lines and Chirped–Grating 6–b Delay Lines", IEEE Transactions on Microwave Theory and Techniques, vol. 45, No. 8, Aug. 1997, pp. 1527–1530.*

Ng, et al.; A Detector–Switched GaAs Monolithic Time–Delay Network for Microwave Phased Arrays at L and X Band; IWA4–1, pp 418–421, Unknown.

Hamamatsu Photonics K,K.; G4176–02 Final Tested Sheet, Mar. 23, 1998.

Orbcomm, System Description <www.orbcomm.com>.

SPIE Web, Optical Engineering Press, "Photonic Control Systems for Phased Array Antennas", SPIE vol MS 136:<www.spie.org/web/abstracts/oepress/MS136.html> Table of Contents only, Oct. 13, 1998.

Homeffer, Martin: ComNets/Aachen U of Technology, "Phased Array Antennas" "Monopulse Technique Required Hardware" "Direction Estimation" Tracking Range "Time Constraints" macho@dfv.rwth–aachen.de.

Teledesic, "Technical Overview of the Teledesic Network" White Paper.

Sullivan, et al., "Switched Time Delay Elements Based on AIGaAs/GaAs Optical Waveguide Technology at 1.32um for Optically Controlled Phased Array Antennas"; SPIE vol. 1703: pp. 264–271, Sep. 1992.

Ng, et al., "High–Precision Detector–Switched Monolithic GaAs Time–Delay Network for the Optical Control of Phased Arrays"; IEEE Photonics Technology Letters, vol. 6, No. 2: pp. 231–234, Feb. 1994.

Burm, et al., "High–Frequency, High Efficiency MSM Photodetectors"; IEEE Journal of Quantum Electronics, vol. 31, No. 8: pp. 1504–1509, Aug. 1995.

Fetterman, et al., "Optically Controlled Phased Array Radar Receiver Using SLM Switched Real Time Delays"; IEEE Microwave and Guided Wave Letters, vol. 5, No. 11: pp. 414–416, Nov. 1995.

Gvozdie, et al., "Nonstationary Response of MSm Photodetectors"; IEEE Transactions of Electron Devices, vol. 43, No. 2: pp. 370–372, Feb. 1996.

Huang, John, "Microstrip Reflectarray Antennas With Mechanical Phasing" NASA Tech Briefs, p. 54, Dec. 1996.

Zmuda, et al., "Photonic Beamformer for Phased Array Antennas Using a Fiber Grating Prism"; IEEE Photonics Technology Letters, vol. 9, No. 2: pp. 241–243, Feb. 1997.

Montgomery, John, "The Orbiting Internet: Fiber in the Sky"; CMPnet, <http://www.cmpnet.com/>.

Teledesic, "Does Latency Matter" White Paper, Dec. 1, 1997.

Teledesic, Teledesic Overview, Jun. 1, 1998.

Teledesic, "Fast Facts", May 22, 1998.

Koh, Philip, "Passive Phased Array Antenna Contruction by Application of a Novel Micromachined Packaging Technique" (Abstract) MicroFab Research, Inc.

Rankin, Jack, "Air Force/Boeing Agreement Important Tool in Developing Emerging Technologies"; ESC Public Affairs.

Henderson, Diedtra, "Boeing Tests Satellite Link for Air Travel, Military" The Seattle Times, Aug. 8, 1996.

Tech–010—A Synopsis, "Deployable Double Membrane Technology—A New Technique for Low Cost, Lightweight, Large Aperture Phased Array Antennas" <info@calcorp.com>.

The Boeing Company, "Boeing Awarded Two NASA Study Contracts", 1996.

The Boeing Company, "Boeing Based Phased Array Antenna Installed on Business Jet", 1996.

The Boeing Company, Boeing Phased Array Antenna Installed on Business Jet:, 1996.

The Boeing Company, "Phased Array Antenna Successfully Demonstrated at Camp Pendleton", 1996.

The Boeing Company, "Boeing Phased—Array Antenna System Completes Flight Tests", Jun. 4, 1996.

Obering, Trey Col., "Boeing Participation in EFX '98", EFX News Release., U.S. Air Force EFX, 1998.

Boeing Prepares AWACS Test Aircraft for Air Force's EFX '98 Defense Daily, 40th Year, vol. 199, No. 46, Jun. 4, 1998.

Koeph, Gerhard A., "Optical Processor for Phased–Array Antenna Beam Formation", SPIE vol. 477, 1984.

Herczfeld, et al., "Wide–Band True Time Delay Phase Shifter Devices", IEEE MTT–S Digest, pp. 603–606, 1987.

Singer, et al., "Second–order nonlinear–optical processes in orientationally ordered materials: relationship between molecular and macroscopic properties", J. Opt. Soc. Am. B/vol. 4, No. 6, pp. 968–976, Jun. 1987.

Voges et al., "Integrated–Optic Devices on $LiNbO_3$ for Optical Communication", Journal of Lightwave Technology, vol. LT–5, No. 9, pp. 1229–1238, Sep. 1987.

Ng et al., "Wideband Fibre–Optic Delay Network for Phased Array Antenna Steering", Electronic Letters, vol. 25, No. 21, pp. 1456–1458, Oct. 12, 1989.

Ng. et al., "Optical Steering of Dual Band Microwave Phased Array Antenna Using Semiconductor Laser Switching", Electronic Letters, vol. 26, pp. 791–793, Jun. 7, 1990.

Völker, M., "Coherent all–fibre optical beam–steering technique for phased–array antennas", IEE Proceedings–J, vol. 139, No. 4, pp. 305–308, Aug. 1992.

Goutzoulis et al., "All–optical hardware–compressive wavelength–multiplexed fiber optic architecture for true time delay steering of 2–D phased array antennas", SPIE vol. 1703 (1992), pp. 604–614, Sep. 1992.

Coward et al., "Phased array antenna beam steering with a photonic I–Q beam forming network", SPIE vol. 1703 (Sep. 1992), pp. 640–650.

Ackerman et al., "Integrated 6–Bit Photonic True–Time–Delay Unit for Lightweight 3–6 GHz Radar Beamformer", 1992 IEEE MTT–S Digest, pp. 681–684, Sep. 1992.

Thai, Serey, "True Time Delay Optically Controlled Dual Band Transmitter", U.S. Department of Defense, Defense Technical Information Center, May 1993.

Sun et al., "Integrated concave grating WDM demultiplexer with 0.144 nm channel spacing", Electronics Letters, vol. 33, No. 13, pp. 1140–1142, Jun. 19, 1997.

Coward et al., "Photonic in–phase/quadrature beam–forming network for phased array antenna applications", Optical Engineering, vol. 32, No. 6, pp. 1298–1302, Jun. 1993.

Molony et al., "Fibre grating time delay element for phased array antennas", Electronics Letters, vol. 31, Aug. 1995.

Loo et al., "5 bit photonic time shifter for wideband arrays", Electronics Letters, vol. 31, Aug. 1995.

Chew et al., "Active Antenna Array with Optical Interaction for Application in Radar System", 1995 IEEE Microwave Systems Conference, pp. 185–187, Aug. 1995.

Paul et al., "Optical beam forming & steering for phased array antenna", SPIE vol. 2482, pp. 246–256, Aug. 1995.

Xu et al., "The Use of Optically Coherent Detection Techniques for True–Time Delay Phased Array and Systems", Journal of Lightwave Technology, vol. 13, No. 8, pp. 1663–1678, Aug. 1995.

Frigyes et al., "Optically Generated True–Time Delay in Phased–Array Antennas", IEEE Transactions on Microwave Theory and Techniques, vol. 43, No. 9, pp. 2378–2386, Sep. 1995.

Tedjini et al., "All–Optical Networks as Microwave and Millimeter–Wave Circuits", IEEE Transactions on Microwave Theory and Techniques, vol. 43, No. 9, pp. 2428–2433, Sep. 1995.

Eldada et al., "Laser–Fabricated Delay Lines in GaAs for Optically Steered Phased–Array Radar", Journal of Lightwave Technology, vol. 13, No. 10, pp. 2034–2040, Oct. 1995.

Soref, Richard A., "Fiber Grating Prism for True Time Delay Beamsteering", Fiber and Integrated Optics, vol. 15, pp. 325–333, 1996.

Xu et al., "True Time–Delay Phased–Array Antenna Feed System Based on Optical Heterodyne Techniques", Technology Letters, vol. 8, No. 1, pp. 160–162, Jan. 1996.

Anderson et al., "Highly Parallel Optical True Time Delay Device for Phased Array Antennas", Proceedings of The Sixth Annual ARPA Symposium on Photonic Systems for Antenna Applications, Mar. 7, 1996.

Tong et al., "A Novel Multiwavelength Optically Controlled Phased Array Antenna with a Programmable Dispersion Matrix", IEEE Photonics Technology Letters, vol. 8, No. 6, pp. 812–814, Jun. 1996.

Merkel et al., "Optical coherent–transient true–time–delay regenerator", Optics Letters, vol. 21, No. 15, pp. 1102–1104, Aug. 1, 1996.

United States Air Force, "Tech Connect Finding Technology Answers", Oct. 1996.

Cummings et al., "Circuit Boards for Testing Alternative Cleaning Processes", NASA Tech Briefs, Dec. 1996.

Frankel et al., "Two–Dimensional Fiber–Optic Control of a True Time–Steered Array Transmitter", IEEE Transactions on Microwave Theory and Techniques, vol. 44, No. 12, pp. 2696–2702, Dec. 1996.

Cohen et al., "Optically Controlled Serially Fed Phased Array Sensors", IEEE Photonics Technology Letters, vol. 8, No. 12, pp. 1683–1685, Dec. 1996.

Li et al., "3–Bit Substrate–Guided–Mode Optical True–Time–Delay Lines Operating at 25 GHz", IEEE Photonics Technology Letters, vol. 9, No. 1, pp. 100–102, Jan. 1997.

Zmuda et al., "Photonic Beamformer for Phased Array Antennas Using a Fiber Grating Prism", IEEE Photonics Technology Letters, vol. 9, No. 2, pp. 241–243, Feb. 1997.

Goutzoulis et al., "Comparison of Conventional and Fiberoptic Manifolds for a Dual Band (UHF and S) Phased–Array Antenna", IEEE Transactions on Antennas and Propagation, vol. 45, No. 2, pp. 246–253, Feb. 1997.

Kang et al., "Fabrication of precision fiber–optic time delays with in situ monitoring for subpicosecond accuracy", Applied Optics, vol. 36, No. 12, pp. 2533–2536, Apr. 20, 1997.

Fuster et al., "Photonic RF phase shifter for harmonic downconversion in phased array antenna beam–forming applications", Electronics Letters, vol. 33, No. 17, pp. 1426–1428, Aug. 14, 1997.

Noguchi, K., "Optical multichannel switch composed of liquid–crystal light–modulator arrays and birefringent crystals", Electronics Letters, vol. 33, No. 19, pp. 1627–1629, Sep. 11, 1997.

Giglmayr, Josef, "Self–routing in 2–D shuffle networks with dimension–dependent switches and interconnections", IEEE, pp. 142–152, Mar. 1997.

Gortych, Joseph E., "Trade Secrets", Optics & Photonics News, pp. 14–15, Feb. 1998.

Esman et al., "Fiber Optic True Time–Delay Array Antenna Feed Systems", U.S. Department of Defense, Defense Technical Information Center, Ser. No. 122,671, Sep. 17, 1993.

* cited by examiner

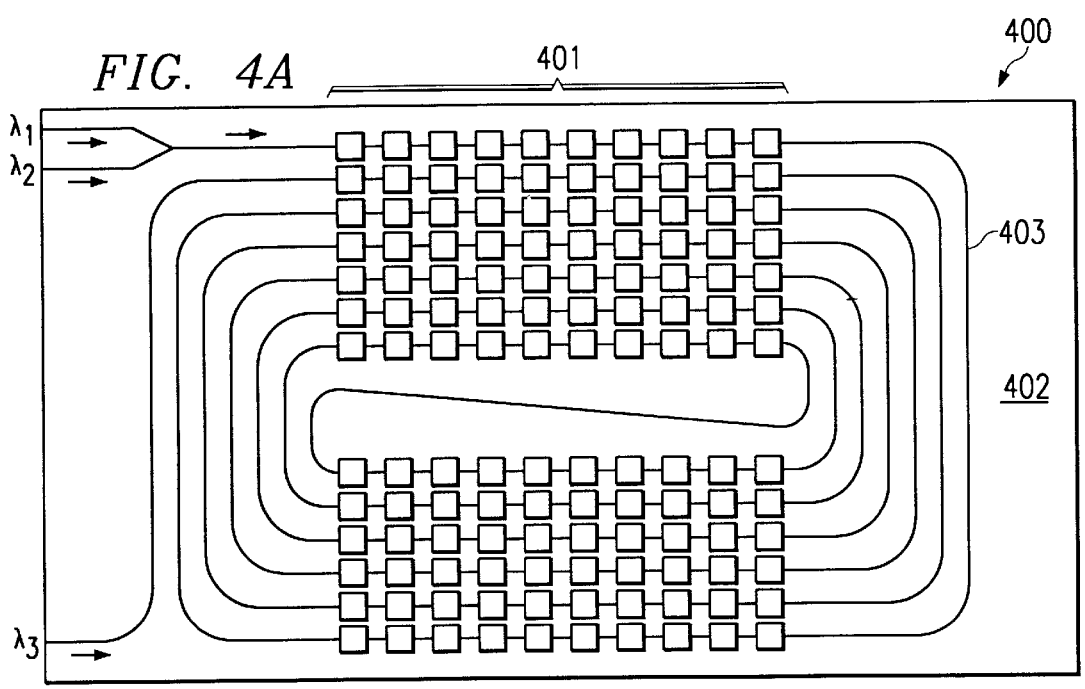
FIG. 4A
FIG. 4B
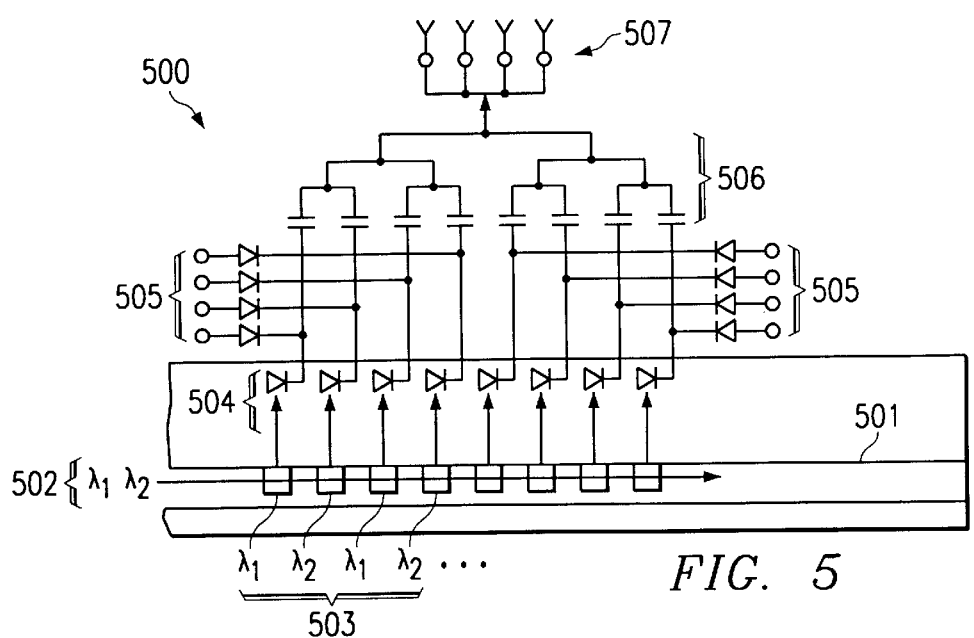
FIG. 5

METHOD, SYSTEMS AND APPARATUS FOR PROVIDING TRUE TIME DELAYED SIGNALS USING OPTICAL INPUTS

CROSS-REFERENCE TO RELATED APPLICATION

This application claims priority to U.S. Provisional Patent Application Ser. No. 60/121,900, filed Mar. 4, 1999, and entitled "Polymer-Based Optical Waveguide Circuits for Phased Array Antennas".

GOVERNMENTAL RIGHTS

The invention was made with Government support under Contract No. F33615-98-C-0357 awarded by USAF/AFMC, Air Force Research Laboratory. The Government has certain rights in the invention.

TECHNICAL FIELD

The present invention generally relates to true-time-delay phase modules, and more particularly, to a method, systems and apparatus for providing true-time-delay signals using optical inputs.

BACKGROUND

The increasing demand on bandwidth and reliability of airborne communication networks have stimulated the replacement of mechanically scanned antennas by phased array antennas allowing independent electronic control of antenna elements increasing the flexibility and the speed of beam forming. In phased array antennas, the phase and amplitude of each radiating element are traditionally controlled through switching the length of electrical delays feeding the antenna elements.

The mechanism of phased-array antennas employing electronically driven antenna elements with individually controllable phase-shift can be described as follows. The wavefront direction of the total radiated carrier wave is controlled through continuously and progressively varying the phase shift of each radiating element, achieving a continuous steering of the antenna. For a linear array radiating elements with individual phase control, the far field pattern along the direction of $\Phi$ can be expressed by equation (1)

$$E(\Phi, t) = \sum_{n=0}^{N} A_n \exp(i\omega_m t)\exp[i(\psi_n + nk_m\Lambda\sin\Phi)] \quad (1)$$

where $A_n$ is pattern of the individual element, $\omega_m$ is the microwave frequency, $k_m = \omega_m/c$ is the wave vector, $\psi_n$ is the phase shift, $\Lambda$ is the distance between radiating elements and $\Phi$ is the direction angle of array beam relative to array normal. The dependence of the array factor on the relative phase shows that the orientation of the maximum radiation can be controlled by the phase excitation between the array elements. Therefore, by varying the progressive phase excitation, the beam can be oriented in any direction. For continuously scanning, phase shifters are used to continuously vary the progressive phase. For example, to point the beam at an angle $\Phi_0$, $\psi_n$ is set to the following value, $$\psi_n = -nk_m\Lambda \sin \Phi_0 \quad (2)$$

Differentiating Equation (2), results in $$\Delta\Phi = -\tan\Phi_0\left(\frac{\Delta\omega_m}{\omega_m}\right) \text{ (rad)}, \quad (3)$$

It is clear that for a fixed set of $\psi_n$'s if the microwave frequency is changed by an amount $\Delta\omega_m$, the radiated beam will drift by an amount $\Delta\Phi_0$. This effect increases dramatically as $\Phi_0$ increases. This phenomenon is the so-called "beam squint", which leads to an undesirable drop of the antenna gain in the $\Phi_0$ direction.

For wideband operation, it is necessary to implement optical true-time-delay steering technique such that the far field pattern is independent of the microwave frequency. In the approach of optical true-time-delay, the path difference between two radiators is compensated by lengthening the microwave feed to the radiating element with a shorter path to the microwave phase-front. Specifically, the microwave exciting the (n+1)th antenna element is made to propagate through an additional delay line of length $D_n = nL(\Phi_0)$. The length of this delay line is designed to provide a time delay $$t_n(\Phi_0) = (n\Lambda \sin \Phi_0)/c \quad (4)$$

for the (n+1)th delay element. For all frequencies $\omega_m$, $\psi_n$ is given by $$\psi_n = -\omega_m t_n(\Phi_n) \quad (5)$$

With such a delay set-up, when the phase term $nk_m\Lambda \sin \Phi$ inside Eq. (1) is changed due to frequency "hopping", the phase term $\psi_n$ will change accordingly to compensate for the change such that the sum of the two remains unchanged. Thus, constructive interference can be obtained in the direction $\Phi_0$ at all frequencies. In other words, the elemental vector summation in the receiving mode or in the transmit mode is independent of frequency, which is crucial for ultra wide band operation for future PAAs.

Conventional phased-array antenna technologies have demonstrated good performance characteristics with limited practicality for commercialization. One conventional system includes utilizing microstrip reflecting array antennas with mechanical phasing for providing phased-array antennas. Unfortunately, mechanical phased microstrip antennas utilize expensive miniaturized motors for providing beam steering through mechanical rotation of each antenna element.

Another conventional system deploys using a fiber grating prism. In fiber Bragg grating prism technology, high performance reflection gratings can be easily fabricated in ultralow-loss optical fibers. However, this configuration requires very expensive fast wavelength tunable laser diodes.

A third conventional method uses thermo-optically switched silica-based waveguide circuits. The thermo-optically-switched silica-based waveguide circuits offers excellent delay time control in a compact structure where the length of waveguide is defined by photolithography. However, the cost associated with using wavelength tunable laser diodes and/or 2×2 thermo-optic switches make commercialization impractical.

Advancements in conventional phased array systems have limited commercialization due to increased system complexity, employing very expensive devices, and requiring extremely difficult fabrication processes.

SUMMARY

In accordance with teachings of the present disclosure, a method, system and apparatus are described for providing phase delayed signals using optical inputs.

In accordance with one aspect of the present invention a delay module is disclosed. The delay module includes a waveguide operable to transmit optical signals and at least one diffraction element positioned along the waveguide and operable to provide a true time delay.

In accordance with another aspect of the present invention, a system for providing phase delayed signals is disclosed. The system includes at least one optical source emitting an optical signal having a predetermined wavelength, an optical waveguide optically coupled to the at least one optical source, a diffraction element optically coupled to the waveguide, the diffraction element positioned along the waveguide at a predetermined distance.

In accordance with another aspect of the present invention, a method for fabricating a delay module is disclosed. The method includes providing a substrate having a waveguide, patterning a diffraction element in relation to the waveguide, and etching the patterned diffraction element to provide the delay module.

In accordance with another aspect of the present invention a system for providing a true time delays is disclosed. The system includes at least one optical source operable to provide a modulated signal having a predetermined wavelength, a waveguide operably coupled to the optical source, the waveguide operable to propagate the signal, plural diffraction gratings positioned at predetermined distance relative to one another and operable to diffract a portion of the modulated signal. The system includes a photodetector operably associated with one of the plural gratings for detecting the diffracted portion of the modulated signal.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4A illustrates a planar view of an array for providing a true time delay according to one embodiment of the present invention;

FIG. 4B illustrates a side view of the array of FIG. 4A;

FIG. 5 is an illustration of schematic diagram of a phase array antenna system using a true time delay module according to one embodiment of the present invention.

DETAILED DESCRIPTION

Preferred embodiments and their advantages are best understood by reference to FIGS. 1 through 6, wherein like numbers are used to indicate like and corresponding parts.

The conceptual groundwork for the present invention involves providing phase delayed signals using optical inputs. According to one aspect of the invention, an optical input may be a light source emitting light at predetermined wavelength. For example, an optical input may include a tunable laser providing optical inputs having desirable wavelengths. In another aspect, an optical input may include an RF modulated optical input produced by various techniques such as optical modulation, optical heterodyning, direct laser modulation, or other modulation techniques. Additionally, the present invention is not limited to a single light source for providing a single optical input and may be used in association with plural optical inputs.

The present invention provides an optical waveguide operable to be coupled to a light source emitting an optical signal at a predetermined wavelength. A diffraction element is optically coupled to the waveguide and positioned at a relative distance along the waveguide such that a true time delay may be provided. For example, a true time delay may be provided based upon the distance the optical signal travels prior to interfacing the diffraction element, a true time delay relative to the propagation of the light signal may be provided. In this manner, the diffraction element may be positioned such that a desirable phased delayed signal may be provided using an optical input.

According to one aspect, plural light sources may be used in association with plural diffraction elements such that plural phase delayed signals may be provided. For example, plural diffraction elements may be provided in association with a first light source and may be positioned at predetermined distances such that desirable true time delays may be provided. Accordingly, plural diffraction elements may be provided in association with a second light source and may be positioned at predetermined distances such that desirable true time delays may be provided for the second light source. In this manner, a single waveguide having plural diffraction gratings may be used to provide several phase delayed signals using plural optical inputs.

Figure 1:
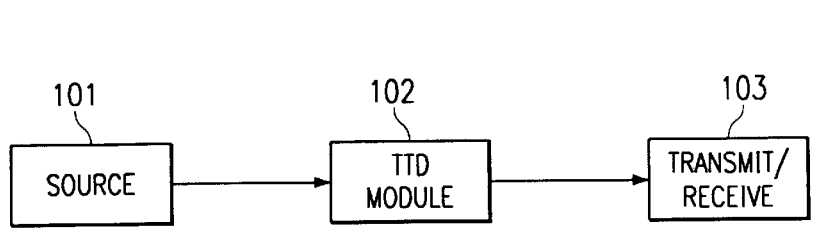
FIG. 1 illustrates a block diagram of a system for providing phase delayed signals according to one embodiment of the present invention.

FIG. 1 is a block diagram of a system for providing phase delayed signals according to one embodiment of the present invention. System 100 includes a source 101 for providing an optical input, such as RF modulated laser light having a predetermined wavelength. Source 101 is optically coupled to true time delay (TTD) module 102 operable to provide a true time delay in association with the optical input. Transmit/receive module 103 coupled to TTD module 102 receives a phase delayed signal in association with the true time delayed optical signal.

In one embodiment, TTD module 102 may be configured with an optical waveguide optically coupled to source 101. The waveguide may be comprised of a predetermined length such that the amount of time light propagates through the waveguide is determinate. TTD module 102 further includes at least one diffraction element operable to diffract a portion of the optical signal input by source 101. The diffraction element may be positioned along the waveguide at a predetermined distance such that the relative position of the diffraction element provides a true time delay of the optical signal. Through positioning the diffraction element along the waveguide, desirable phase delayed signals (i.e. 30°, 93°, 147°, etc.) may be realized using an optical signal.

In one embodiment, system 100 may be operable as a phased array antenna. Transmit/receive module 103 may be configured with at least one array antenna element operable to receive relative phase delayed signals provided by TTD module 102. The relative phase delayed signals provide a controllable phase shift of the antenna element thereby varying the direction of the phased array antenna. Therefore, through providing relative phase delayed signals using TTD module 102, system 100 may be operable to transmit or receive signals as a phased array antenna.

System 100 may also operate as a phased array antenna having plural phase antenna elements operable to receive or transmit signals. For example, system 100 may include a single TTD module for each phase antenna element of the phased array antenna. During a transmit period, each TTD module drives an associated antenna element at a predetermined phase provided by an associated TTD module such that the phase array antenna can transmit signals in plural directions.

In one embodiment, system 100 may be configured as a phased array antenna having plural phase antenna elements operable to receive a signal that utilizes a single TTD module in association with each antenna element to maintain phase accuracy of the received signal. Therefore, through system 100 deploying true time delay modules for providing phase delayed signals, accurate signal reception and transmission can be maintained for a phased array antenna.

Figure 2:
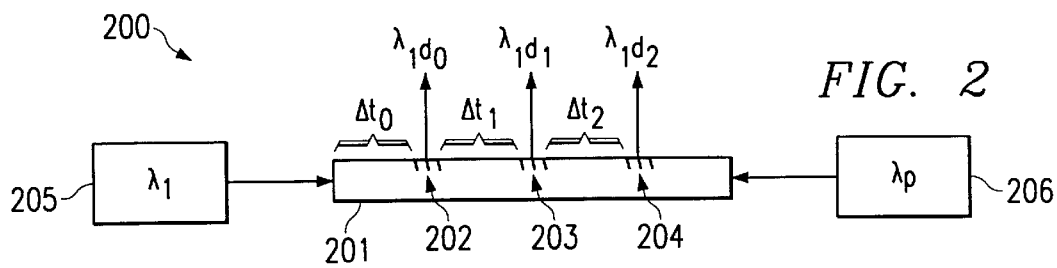
FIG. 2 is a schematic illustration of a true time delay module according to one embodiment of the present invention.

Referring now to FIG. 2, a schematic illustrating a true time delay module according to one embodiment of the present invention is shown. Module 200 is coupled to source 205 having a wavelength $\lambda_1$. Module 200 includes waveguide 201 optically coupled to source 205. Module 200 further includes several diffraction elements 202, 203, and 204 configured as diffraction gratings and positioned along waveguide 201. Module 200 further includes source 206 having a wavelength $\lambda_p$ for regenerating propagation and diffraction losses in the optical signal generated by source 205. Diffraction gratings 202, 203, and 204 may be positioned along waveguide 201 such that desirable time delays of optical signal $\lambda_1$ provide associated phase delayed signals.

During operation, source 205 emits an optical signal $\lambda_1$ along optical waveguide 201. The optical signal travels a predetermined distance until incident on diffraction grating 202 thereby creating time delay $\Delta t_0$. Diffracted light $\lambda_1$ $d_0$ is characteristic of the time delay $\Delta t_0$ of the optical signal relative to the length of time the optical signal took to propagate to diffraction grating 202. In one embodiment, diffracted light $\lambda_1$ $d_0$ may be operable as a reference phase delay signal having a phase delay of 0°, 90°, etc. Therefore, through positioning diffraction grating 202 at a distance along waveguide 201, desirable phase delay signals may be provided.

Similarly, upon module 200 diffracting the optical signal using diffraction grating 202, the optical signal propagates until incident on grating 203 creating a true time delay $\Delta t_1$ thereby providing diffracted light $\lambda_1$ $d_1$ having a phase delay signal characterized by the amount of time the optical signal took to propagate from diffraction grating 202 to diffraction grating 203. Therefore, configuring grating 202 and grating 203 at a predetermined distance enables the true time delay module to provide a true time delay for the optical signal resulting in a phase delayed signal (i.e. 30°, 55°, etc.). Similarly, diffraction grating 204 may be placed at a predetermined distance relative to diffraction grating 203 for providing a phase delayed signal.

In one embodiment, gratings 202, 203, 204 may be fabricated using conventional semiconductor techniques as described below. A tilt angle associated with the gratings may be calculated for a specific application such as the module of FIG. 2. Therefore, the equations below take into consideration only those variables associated with providing an exemplary grating. The following equations are illustrative of one example of calculating a tilt angle for a grating operable to provide a true time delay.

Calculation of a grating's tilt angle includes calculating a grating period $\Lambda$ as a function of the diffraction angle $\theta_m$ having a diffraction order m of the optical signal, the wavelength of the optical source, the refractive index of the waveguide $n_1$ and the refractive index of the cladding $n_2$. The grating period $\Lambda$ may be calculated by the equation:

$$\Lambda = \frac{m\lambda n_1}{n_2 \tan\theta_n}[1+\tan^2\theta_m]^{1/2}$$

Assuming that $n_1$ and $n_2$ are the refractive indices of the waveguide structure and a grating element, a geometric average of the refractive index of the grating region can be provided by:

$$n_g^2 = n_1^2 d + n_2^2(1-d)$$

Where d is the grating element width-to-period ratio. The optimum tilt angle for first-order Bragg diffraction can be calculated by:

$$\theta_{Tilted} = \arccos \frac{\lambda_0}{\Lambda\sqrt{n_g^2 - n_{eff}^2 + \frac{2n_{eff}\lambda_0}{\Lambda}}}$$

wherein $n_{eff}$ is the effective index of the waveguide including the grating and $\Lambda$ is the grating period. For example, the tilt angle can be calculated for a first order Bragg diffraction with a light source having a wavelength of 1.064 um, a $\Lambda$ of 0.682, a diffraction angle of 90 degrees, waveguide refraction index of 1.56 and a cladding refraction index of 1.0. For a symmetric grating having a grating element-to-period ratio of 0.5 and a geometric average of the squared refractive index of the grating region being 1.31, the optimum tilted angle is 40 degrees for the diffraction grating.

Figure 3:
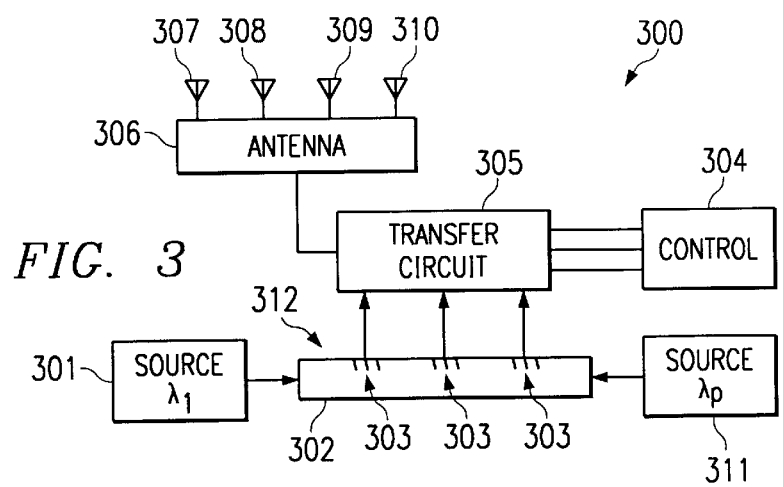
FIG. 3 is a schematic illustration of a phase array antenna system according to one embodiment of the present invention.

Referring now to FIG. 3, an illustration of a phase array antenna system according to one embodiment of the present invention is shown. The system, shown generally at 300, includes source 301 having a wavelength $\lambda_1$ and operable to provide an RF modulated signal. System 300 further includes a true time delay module 312 comprising an optical waveguide 302 optically coupled to source 301 and plural gratings 303 placed at predetermined distances along waveguide 302. Gratings 303 are configured to diffract a portion of the optical signal generated by source 301. Transfer circuit 305 is optically coupled to gratings 303 and include high-speed photodetectors for detecting the diffracted optical signal provided by gratings 303. Control circuit 304 includes circuitry for selecting active elements within antenna 306 and provide control of the active lines selected in transfer circuit 305. Transfer circuit 305 is coupled to antenna 306 for providing phase delayed signals diffracted by true time delay module 312. Antenna 306 includes array elements 307, 308, 309, and 310 for transmitting or receiving signals. System 300 further includes a pumping source $\lambda_p$ reducing power losses associated with the optical signal propagating through waveguide 302.

During operation, light source 301 provides an optical signal, such as a modulated RF signal, having a predetermined modulation to true time delay module 312. The optical signal propagates through waveguide 302 for a predetermined distance until incident on gratings 303. The first grating is placed at a predetermined distance from the second grating having a true time delay for providing a phase delayed signal. Control circuit 304 controls which phase delay signal is provided to antenna 306. For example, control circuit 304 enables selective high-speed photodetectors associated with transfer circuit 305 such that upon a selective high-speed photodetector detecting the phase delayed signal, the signal is transferred to a selective antenna element. In this manner, selective phase delayed signals may be provided to antenna 306 for operating phase array antenna system 300.

Referring now to FIG. 4A, a planar view of an array for providing a true time delay according to one embodiment of the present invention is shown. The apparatus, shown generally at 400, includes an array of gratings 401 spaced at predetermined intervals for providing a predetermined time delayed signal. In this embodiment, the array 401 is fabricated on substrate 402 such as silicon and include a waveguide 403 for communicating optical signal $\lambda_1$, having a first frequency, and $\lambda_2$ having a second frequency. $\lambda_1$ and $\lambda_2$ propagate through waveguide 403 configured in a spiral configuration such that a single source $\lambda_1$ and $\lambda_2$ may be used to generate plural time delays. Unlike conventional systems, system 400 advantageously utilizes a single source for providing several time intervals through the incident light impending the array of gratings.

In one embodiment, the apparatus illustrated in FIG. 4A may be obtained using standard VLSI lithography techniques allowing for precise control of the optical wave guide length. Waveguide 401 may be configured to be 10 meters in length with accuracy in the sub-micron range. Therefore, a true time delay module 400 can be created using polymeric waveguide circuits capable of providing 0.1 ps true time delay resolutions over a 50 ns range with minimal propagation losses of a signal. For example, waveguide 401 configured as a ten meter long polymeric waveguide may experience 0.02 dB/cm loss for a source wavelength of 1064 nm.

The gratings, therefore, configured as an array can provide desirable time delays utilizing diffracted light. FIG. 4B illustrates a side view of the apparatus of FIG. 4A and includes source $\lambda_1$ and $\lambda_2$ incident on the array of grating for providing true time delays. As illustrated, selective arrays indicated by $\lambda_1$ $d_x$ are responsive to $\lambda_1$ while selective delays $\lambda_2$ $d_x$ are responsive to $\lambda_2$ thereby providing elements responsive to plural signal sources.

Referring now to FIG. 5 an illustration of schematic diagram of a phase array antenna system using a true time delay module according to one embodiment of the present invention. The system, shown generally at 500 includes optical inputs 501 comprise of two wavelengths $\lambda_1$ and $\lambda_2$ shown generally at 502. Plural gratings 503 are coupled to waveguide 501 such that plural waveguides diffract light at a predetermined time delay. For example, the distance between the first $\lambda_1$ grating to the second $\lambda_1$ grating provides a predetermined time delay in the signal diffracted by each grating. An array of photodetectors 504 are provided in association with each grating responsive to the light source. Control circuit 505 is further coupled to photodetector array 504 for selecting an appropriate time delay for a generated signal. Coupling capacitors 506 couple control circuit 505 to an output antenna 507 configured as a phase array antenna for providing or receiving a selective signal.

During operation of system 500, plural optical inputs traverse optical wave guide 501. Control circuit 605 enables an appropriate photodetector circuit to provide communication of a true time delayed signal to antenna 507. For example, system 500 may be operable to utilize $\lambda_1$ at having a 30 degree offset and $\lambda_2$ at offset from $\lambda_1$ by 15 degrees. Therefore, control circuit 505 may be operable to enable the appropriate photodetectors 504 for communicating optical signals $\lambda_1$ and $\lambda_2$ incident on the appropriate grating 503 for providing phase delayed signals using true time delays to antenna 507 utilizing diffracted light. In this manner, a true time delay may be provided for a phase delay antenna through configuring the diffraction gratings at predetermined spacing or intervals. The invention$_{13}$ allows system 500 to provide a true time delay for plural optical outputs.

Figure 6:
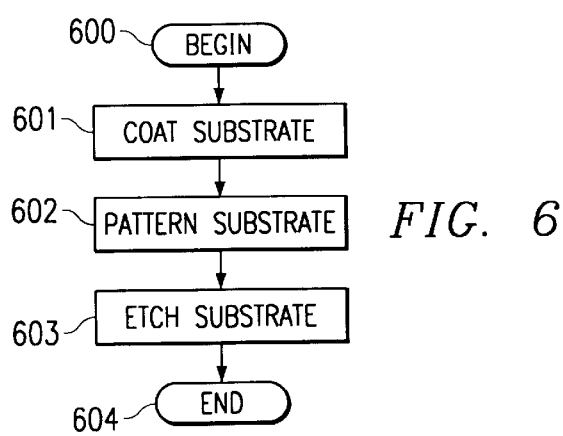
FIG. 6 is a block diagram illustrating a method of fabrication a diffraction element.

Referring now to FIG. 6 a block diagram illustrating a method of fabrication a diffraction element is shown. The fabrication method may be used to create the time delay module and associated circuitry. The method begins by providing a substrate for creating optical and microelectronic circuitry. The substrate may include previously processed layers used to form a desirable structure. For example, an optical waveguide may be first fabricated using a polymeric material. A thin aluminum metal layer, about 500 Angstroms, may be disposed over the waveguide by an electron beam vaporization technique. The method of FIG. 6 would then be used in conjunction with the previously layers by proceeding to step 601 where the substrate is coated with a photoresist, such as 5206 E photoresist manufactured by Hoechst Celanses, for patterning the grating structure. The method proceeds to step 602 where the grating is patterned using a photolithography technique such as exposing a photomask having a relative geometric dimension of the final grating. Upon patterning the grating the method proceeds to step 603 where the substrate is etched to create an opening in the metal layer to expose the portion of the waveguide for the grating. The method then proceed to step 603 where a reactive ion etch process is used to create the grating. The RIE etch is used in a low oxygen environment at a pressure of approximately 10 millitorr for transferring. To form the tilted grating the substrate is positioned in the RIE chamber at a predetermined angle, such as 40 degrees, relative to the incoming oxygen ions. In this manner, desirable gratings can be formed using conventional VLSI techniques thereby providing a microelectronic structure capable of providing a true time delay for optical signals.

Additionally, the time delay module created by the method of FIG. 6 may be created on a substrate having associated electronic circuitry for detecting and communicating the a true time delay circuit utilizing diffracted light. The method of FIG. 6 may also be deployed utilizing other fabrication techniques. For example, other lithographic techniques, such as laser-writing photolithography techniques, compression-molding techniques, x-ray photolithography, may be used for deploying the method illustrated in FIG. 6.

The method of FIG. 6 provides a polymeric based waveguide delay line fabricated in planarize geometry for implementations of photodetector arrays for receiving optical signals diffracted from a grating. Surface normal coupling of the signal may be provided through implementing microstructure gratings tilted at predetermined angles and spaced apart at predetermined distances such that surface normal coupling is provided. In one embodiment, surface of the gratings may be configured as a titled microstructure of a holographic dispersion grating.

In one embodiment, ultra wideband operation, such as 11 GHz to 40 GHz, can be employed by the present invention. Several different techniques such as harmonic generation in a Mach-Zehnder modulator, heterodyne mixing of two lasers, resonance enhanced modulation of a laser diode, and dual mode DFB laser in a mode-locked operation.

The present invention provides a system, apparatus, and method for providing phase delayed signals using optical inputs. In one embodiment, a polymeric waveguide having a length of 10 meters is provided having a propagation loss of approximately 0.02 dB/cm. The present invention further provides a waveguide having at least one grating for providing a true time delay signal fabricated utilizing conventional fabrication processes. The gratings may be fabricated in conjunction with the waveguide and advantageously positioned such that surface normal detection of an optical RF signal can be sensed by high-speed photodetectors. In one embodiment, the photodetectors may be fabricated on the substrate and may be controlled by a control circuit switching selective diodes on and off to provide phase delayed signals associated with selective true time delays.

Although the disclosed embodiments have been described in detail, it should be understood that various changes, substitutions and alterations can be made to the embodiments without departing from their spirit and scope.

What is claimed is:

1. A delay module comprising:
   a waveguide operable to transmit an optical signal;
   diffraction elements positioned along the waveguide to reflect a fraction of the optical signal toward a unique one of the plurality of photodetector circuits; and
   a control circuit selecting one of the plurality of photodetector circuits so that a signal is transmitted to an antenna from the selected photodetector circuit to provide a unique amount of true time delay.

2. The module as recited in claim 1, wherein the waveguide comprises a polymer.

3. The module as recited in claim 1, wherein the module is fabricated using microelectronic fabrication processes.

4. The module as recited in claim 1, wherein the diffraction elements comprise a grating.

5. The module as recited in claim 4 wherein the grating comprises plural elements.

6. The module as recited in claim 5 wherein the plural elements are positioned at a predetermined angle relative to the waveguide.

7. The module as recited in claim 1, wherein the diffraction elements include plural gratings positionable at predetermined distances associated with a delay.

8. The module as recited in claim 1, further comprising a light source that generates the optical signal, wherein the light source is modulated.

9. The module as recited in claim 1, further comprising a laser light source that generates the optical signal.

10. The delay module of claim 1, wherein the optical signal originates from a laser diode providing optical signals of one wavelength.

11. The delay module of claim 1, wherein each of the diffraction elements reflects signals as a unique optical output such that the number of optical outputs is equal to the number of diffraction elements.

12. The delay module of claim 11, wherein the optical outputs from the diffraction elements are parallel to one another.

13. The delay module of claim 1, wherein the diffraction elements are surface relief etched gratings.

14. The delay module of claim 1, wherein each of the diffraction elements causes a unique amount of true time delay to the optical signal and the control circuit's selection is based on a desired amount of time delay.

15. A system for providing phase delayed signals, the system comprising:
   an optical source emitting an optical signal having a predetermined wavelength;
   an optical waveguide optically coupled to the optical source;
   diffraction elements optically coupled to the optical waveguide, each of the diffraction elements reflecting an incident portion of the optical signal with a unique amount of time delay;
   an array of photodiodes, each photodiode optically coupled to a unique one of the diffraction elements; and
   a control circuit electrically coupled to the photodiodes and sending signals from one of the photodiodes to an antenna.

16. The system as recited in claim 15, wherein the diffraction elements are positioned at predetermined positions.

17. The system as recited in claim 16, wherein the plural elements comprise an array.

18. The system as recited in claim 17 wherein the array of elements are operably associated with an antenna array.

19. The system as recited in claim 18 wherein the antenna array is operable as a phase array antenna.

20. The system as recited in claim 18, wherein the at least one antenna array is operable to receive a signal.

21. The system as recited in claim 18, wherein the at least one antenna array is operable to transmit a signal.

22. The system as recited in claim 18, wherein the waveguide comprises a spiral geometry.

23. The system as recited in claim 15, wherein the system is fabricated using microelectronic fabrication processes.

24. The system as recited in claim 15, wherein at least one of the diffraction elements is configured as a grating.

25. The system as recited in claim 15, further comprising a second optical source operable to regenerate the optical signal.

26. A delay module comprising:
   a polymeric waveguide operable to transmit optical signals;
   at least one optical input through which the optical signals enter the polymeric waveguide;
   a plurality of diffraction elements positioned along the waveguide and operable to provide a true time delay;
   a plurality of optical outputs located along the waveguide, each optical output being associated with one of the diffraction elements and having a different path from the at least one optical input; and
   an array of photodiode circuits receiving the optical outputs, wherein only a selected one of the photodiode circuits generates and transmits a signal to an antenna.

27. A system for providing phase delayed signals, the system comprising:
   an optical waveguide receiving an optical signal;
   a plurality of diffraction elements located along the waveguide, each diffraction element designed to reflect a fraction of the optical signal and provide a unique amount of true time delay to a respective reflected fraction;
   an array of photodetectors, wherein each photodetector is optically coupled to a unique one of the diffraction elements; and
   a control circuit coupled to the array of photodetectors for selecting at least one photodetector and directing the optical signals from the selected photodetectors to one or more antenna coupled with the control circuit.

28. The system as recited in claim 27, wherein the array of photodetectors are built in a single semiconductor substrate.

29. The system as recited in claim 27, wherein the array of photodetectors, the waveguide, and the diffraction gratings are built on a single semiconductor substrate using lithography.

* * * * *